J. S. HAGERTY.
Dinner-Kettle.
No. 204,817.                    Patented June 11, 1878.
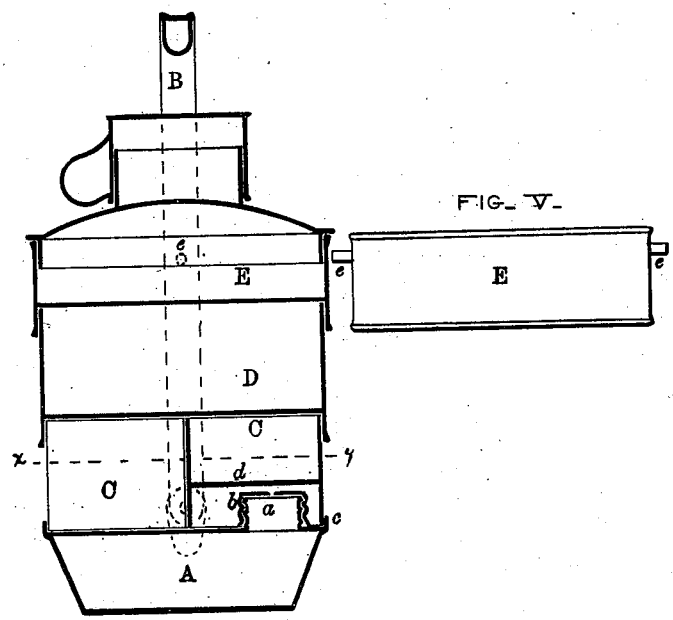

UNITED STATES PATENT OFFICE.

JAMES S. HAGERTY, OF BALTIMORE, MARYLAND.

IMPROVEMENT IN DINNER-KETTLES.

Specification forming part of Letters Patent No. 204,817, dated June 11, 1878; application filed May 10, 1878.

*To all whom it may concern:*

Be it known that I, JAMES S. HAGERTY, of the city of Baltimore and State of Maryland, have invented certain Improvements in Sheet-Metal Vessels, of which the following is a specification; and I do hereby declare that in the same is contained a full, clear, and exact description of my said invention, reference being had to the accompanying drawings, and to the letters of reference marked thereon.

This invention relates to certain improvements in a lunch or dinner kettle—that is to say, a vessel having a flask for containing tea, coffee, or other beverage, and isolated compartments for meats, vegetables, and other articles of food, the whole being combined in such manner as to form a convenient portable device.

In the description of the invention which follows, reference is made to the accompanying drawings forming a part hereof, and in which—

Figure 1 is a sectional elevation of the improved lunch-kettle. Fig. 2 is a transverse section of the invention on the dotted line $xy$. Figs. 3 and 4 are top views of parts of the device, and Fig. 5 an exterior side view of another part of the same.

Similar letters of reference indicate similar parts of the invention in all the views.

A is a flask for tea, coffee or other liquid, consisting of a practically closed vessel, having a filling-aperture, $a$, and screw-cap $b$. The flask A serves as the base of the kettle, and is the only section or compartment of the device permanently connected to the bail B, to which it is pivoted. C C are removable triangular vegetable-dishes, resting upon the flask A, and confined, when in place, at their lower edges by means of a flange, $c$, extending from the flask, and at their upper edges by the meat-tray D. One of the triangular dishes is specially designed to fit over the screw-cap $b$, and with this view has its bottom $d$ slightly elevated, as shown in the drawing. The upper compartment E is designated the dessert-tray, and is provided with a cover, having a stand for a cup.

When the sections of the kettle are combined, as shown in Fig. 1 of the drawing, they are locked by springing the bail, which is perforated, over the pins $e$ projecting from the tray E. The pins $e$, in connection with the perforated bail, form a cheap, simple, and effective lock. Other locking devices may, however, be used in lieu of those shown herein without affecting the nature of the invention.

By constituting the flask A the base of the kettle, the contents thereof are more rapidly heated than if the same were situated in the upper part of the kettle, as is usual.

The division of the vegetable-compartment of the kettle into dishes by means of radial partitions has the effect of giving a larger number of distinct sections to the device without increasing its height; and by making the dishes separate and removable, they may be emptied without mixing the contents.

Having thus described my invention, what I claim as new, and wish to secure by Letters Patent of the United States, is—

The removable triangular dishes C, which, together, form a cylindrical section of the kettle, combined with a bottom receptacle for liquids, and a series of cylindrical food-sections, the whole being fitted and held together by means of a bail and locking devices, substantially as specified.

In testimony whereof I have hereunto subscribed my name this 22d day of April, in the year of our Lord 1878.

JAMES S. HAGERTY.

Witnesses:
JOHN M. DE GOEY,
JNO. T. MADDOX.